(12) United States Patent
Barkan

(10) Patent No.: US 7,264,166 B2
(45) Date of Patent: Sep. 4, 2007

(54) BARCODE IMAGING AND LASER SCANNING SYSTEMS HAVING IMPROVED VISUAL DECODING INDICATION

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 148 days.

(21) Appl. No.: 10/998,693

(22) Filed: Nov. 29, 2004

(65) Prior Publication Data

US 2006/0113389 A1   Jun. 1, 2006

(51) Int. Cl.
*G06K 7/10* (2006.01)

(52) U.S. Cl. ............... 235/462.21; 235/462.01; 235/462.2; 235/472.01

(58) Field of Classification Search ......... 235/462.2, 235/462.21, 462.23, 462.32, 436, 472.03
See application file for complete search history.

(56) References Cited

U.S. PATENT DOCUMENTS

| 5,834,754 A | * | 11/1998 | Feng et al. | 235/472.01 |
| 5,925,870 A | * | 7/1999 | Wilz et al. | 235/462.32 |
| 5,969,321 A | * | 10/1999 | Danielson et al. | 235/462.01 |
| 6,766,955 B2 | * | 7/2004 | Patel et al. | 235/462.45 |
| 7,090,137 B1 | * | 8/2006 | Bennett | 235/472.01 |
| 7,128,266 B2 | * | 10/2006 | Zhu et al. | 235/462.22 |

* cited by examiner

*Primary Examiner*—Seung Ho Lee
(74) *Attorney, Agent, or Firm*—Carter, DeLuca, Farrell & Schmidt, LLP

(57) ABSTRACT

Barcode imaging and laser scanning systems are disclosed having at least one processor storing barcode decoding algorithms each corresponding to a respective symbology. The at least one processor causes at least one LED and/or a projected laser beam of the barcode imaging system to blink by rapidly turning it off and on one time or several times whenever a successful decode occurs. In the laser scanning system, the at least one processor causes a projected laser beam to be blinked by turning a laser beam system off and on one time or several times whenever a successful decode occurs. The act of blinking the at least one LED and/or the projected laser beam in the barcode imaging system or the act of blinking the projected laser beam in the laser scanning system provides a visual indication to a user of a successful decode. The act of blinking can also be used to visually indicate other information to a user. The act of blinking can be replaced by the act of changing the brightness of the at least one LED and/or projected laser beam in the barcode scanning systems.

27 Claims, 6 Drawing Sheets

BARCODE IMAGING AND LASER SCANNING SYSTEMS HAVING IMPROVED VISUAL DECODING INDICATION

BACKGROUND OF THE INVENTION

1. Technical Field

The present disclosure relates generally to barcode imaging and laser scanning systems. In particularly, the present disclosure relates to barcode imaging and laser scanning systems having improved visual decoding indication.

2. Description of the Prior Art

Handheld barcode systems that use linear sensor arrays or a laser beam to capture an image of a single line across a barcode are common, such as used in point-of-sale systems. A barcode scanner of a barcode imaging system usually includes an illumination system which shines light on the barcode in the area where an image sensor is aimed, so as to improve the quality of the image that is captured by the image sensor and to eliminate total dependency on ambient light conditions.

For best performance, typically in barcode imaging systems, the light projected from the illumination system is concentrated as much as possible on the line that is scanned by the sensor array of the barcode scanner. This has the visual appearance of a bright thick line that is projected out of the front of the barcode scanner onto the barcode being imaged. This visible line performs the secondary function of creating a visual indication of where the image sensor is aimed, allowing the user to position the barcode scanner so that the visible line is on the barcode to be imaged.

Typically, the illumination system in a barcode imaging system turns on when a trigger switch of the barcode scanner is pressed, and the illumination system turns off as soon as the barcode scanner decodes a barcode, or when the trigger is released, or after a predetermined time period has elapsed. If the barcode scanner turns off due to successfully reading a barcode, the extinguishing of the illumination system of the barcode imaging system is accompanied with an audible indication from a speaker or beeper, and, in most cases, also with the illumination of an indicator LED in the housing of the barcode scanner.

Although this combination of actions upon a successful decode has generally proven to provide adequate user feedback that a decode has been achieved by a barcode imaging system, there is room for improvement. There is also room for improvement for laser barcode scanning systems where generally the actions performed after a successful decode is an audible indication from a speaker or beeper and/or the turning off of a laser beam system.

However, it has been found that most users depend almost entirely on the audible indication to know when a decode has occurred in prior art barcode imaging and laser barcode scanning systems. The audible indicator, however, is not always adequate, such as, for example, in noisy environments, or where it must be turned off due to the desirability to maintain silence or where the beeping sound is annoying or distracting to people nearby.

In these environments, users often rely on the turning on and turning off of the illumination system or the laser beam system as an indication of a decode in barcode imaging and laser barcode scanning systems, respectively. This, however, is not foolproof as the illumination system or laser beam system might have been turned off for reasons other than a decode, such as the elapsed time limit having been exceeded or because of the operator accidentally relaxing pressure on the trigger switch, both of which would result in the illumination system or laser beam system being turned off without the barcode having been decoded. Whenever this occurs, the integrity of the data being collected by the imaging or laser scanning process is compromised. It is therefore important to find a non-ambiguous method to indicate when a barcode scanner of barcode imaging and laser barcode scanning systems has decoded a barcode.

One attempt to solve this problem has been to install an additional optical system in a handheld barcode scanner in order to project a spot of light out the front of the scanner whenever a decode occurs. When a user sees this spot of light, the user will know that a barcode has been decoded. While this is an improvement over prior art barcode scanner designs, it still has several shortcomings. One problem is that the spot of light is generally small, and due to tolerances in the optical system that projects it, the spot of light does not always shine exactly at the center of the reading field of the barcode scanner. The result of the latter is that the spot of light will sometimes miss the object being scanned, especially if the object is small. If the spot of light misses the object, the user will typically not see the spot of light and might assume the barcode was not decoded, resulting in a second unwanted attempt to scan the same barcode. Further, another problem is that the additional optical system for projecting the spot of light adds cost and size to the barcode scanner.

A need therefore exists for a barcode imaging/decoding system having an improved visual decoding indication that overcomes the shortcomings of prior art barcode imaging/decoding systems, as well as prior art laser barcode scanning/decoding systems.

Additionally, with respect to prior art barcode imaging systems, as well as laser barcode scanning systems, many prior art barcode scanners of these systems are designed to be used in a hands-free mode where they are placed in a stand or cradle, as opposed to being held by the user's hand. Such prior art barcode scanners when placed in the stand are automatically placed in an automatic, continuous scanning mode, so that there is no need to press a trigger switch to image or laser scan a barcode that is positioned in front of the barcode scanner.

Many barcode imaging scanners when used in the hands-free mode have their illumination system turned off during the time that no barcode is being presented to the barcode scanner. The imaging barcode scanner continues to process the signal from the sensor array, which can provide a useful, if not optimum signal even with the barcode scanner's illumination system being deactivated. Since the illumination system is not activated during this time, the barcode scanner depends on ambient light in order to capture images of sufficient quality. In this mode, the signal from the image sensor is analyzed to determine if there is a change in the signal from one scan to the next. If a change of sufficient magnitude is detected, it is assumed that a user has placed a barcode in front of the barcode scanner. The barcode scanner, therefore, turns on its illumination system to improve signal quality so as to allow decoding of the barcode.

A problem with such prior art barcode imaging systems, is that before an object is placed in front of the hands-free barcode scanner, the illumination system is turned off, so there is no visual guide for the user to know exactly where the barcode should be positioned for imaging. The user guesses where the visible line will be projected from the barcode scanner, moves the barcode to the imaginary location, and when the illumination system finally turns on, the user corrects or adjusts the location of the barcode as necessary to bring it to the proper location for imaging. Obviously, it would be better if it was clearly indicated to the user where the barcode should be positioned, so that the barcode can be positioned in the proper location by the user.

A solution to this problem is to provide hands-free barcode imaging scanners with the optical system described above which projects the spot of light. However, instead of projecting the spot of light to indicate the occurrence of a decode as described above, when operating the barcode scanner in the hands-free mode the optical system continuously projects the spot of light, thereby giving guidance to the user where to position the barcode. Accordingly, the addition of the optical system to a hands-free barcode scanner enables better operation of the scanner, but it necessitates for the barcode scanner to bear the extra size and cost of the optical system that projects the spot of light. Additionally, since the spot of light is continuously projected, it can no longer serve the other function of visually indicating a decode by turning on only after a decode has occurred.

A need therefore exists for an improved visual decoding indication when operating a barcode scanner of a barcode imaging/decoding system in a hands-free mode that overcomes the shortcomings of the prior art barcode imaging/decoding systems. A need also exists for an improved visual decoding indication when operating a barcode scanner of a laser barcode scanning/decoding system in a hands-free mode.

SUMMARY OF THE INVENTION

The present disclosure provides a barcode imaging/decoding system having improved visual decoding indication that overcomes the shortcomings of prior art barcode imaging/decoding systems and prior art laser barcode scanning/decoding systems. In both type of systems, a barcode is read by scanning the barcode (either by imaging or laser scanning) and decoded as known in the art.

The imaging/decoding system includes a barcode scanner having a trigger switch for being operated in a trigger-operated mode, an illumination system having a plurality of LEDs, and an imaging engine having a lens assembly and a sensor array, such as a CCD or CMOS sensor array, for imaging a barcode located in a field of view of the imaging engine upon activation of the trigger switch and the illumination system. The system also preferably includes an aiming system having a plurality of LEDs or a laser beam system, as is known in the art, for projecting an aiming pattern onto the field of view for aiding in properly positioning the barcode in the field of view of the barcode scanner. One skilled in the art can appreciate that the illumination system and the aiming system can be one and the same for performing illuminating and aiming functions as known in the art.

The system further includes at least one processor storing algorithms each corresponding to a respective symbology. The at least one processor utilizes one of the algorithms for decoding the imaged barcode as known in the art. The at least one processor further stores a set of programmable instructions for turning on the LEDs of the illumination system upon activation of the trigger switch and for blinking at least one LED or all the LEDs of the illumination and/or aiming system by turning them off and on one time or several times whenever the at least one processor successfully decodes the imaged barcode. The at least one processor can further turn on and off one time or several times the laser beam system projecting a laser beam of the aiming system whenever the at least one processor successfully decodes the imaged barcode. The act of blinking the LEDs of the illumination and/or aiming system or the projected laser beam one time or several times provides a visual indication to a user of a successful decode.

The act of blinking is also performed for a laser barcode scanning/decoding system for providing a visual indication to the user of a successful decode. In this system, the at least one processor is programmed to execute a set of stored programmable instructions for causing a projected laser beam to blink by turning off and on one time or several times a laser beam system projecting the laser beam whenever the at least one processor successfully decodes a laser scanned barcode. To cause the laser beam to be turned off and on, the at least one processor, after a successfully decode, controls activation of the laser beam system which generates the laser beam. In the laser barcode scanning/decoding system, the act of blinking the projected laser beam one time or several times provides a visual indication to the user of a successful decode.

When operating an imaging barcode scanner in a hands-free mode by placing it in a stand or cradle as known in the art, the at least one processor controls the LEDs of the illumination system and/or aiming system such that the LEDs of the illumination system and/or aiming system illuminate at a reduced brightness level. The LEDs of the illumination and/or aiming system while illuminating at the reduced brightness level project a visible line of light indicating where the barcode should be positioned. When the barcode scanner detects that a barcode is positioned within its field of view as known in the art, the at least one processor controls the illumination and/or aiming system for illuminating the LEDs at a full brightness level to assure aggressive decoding of the barcode.

When a successful decode occurs, the at least one processor causes at least one LED or all the LEDs of the illumination and/or aiming system to blink by turning them off and on one time or several times to provide an unambiguous visual indication of a successful decode. The at least one processor then causes the LEDs of the illumination and/or aiming system to illuminate at the reduced brightness level in preparation for the next barcode. When the barcode scanner is removed from the stand or cradle, the barcode scanner automatically returns to the trigger-operated mode and all LEDs of the illumination and/or aiming system are turned off, until the trigger switch is pressed.

The act of blinking can also be performed for a laser barcode scanning/decoding system having a barcode scanner capable of being operated in a hands-free mode for providing a visual indication to the user of a successful decode. In this system, the at least one processor is programmed to execute a set of stored programmable instructions for causing a projected laser beam to blink by turned off and on one time or several times whenever the at least one processor successfully decodes a laser scanned barcode. To cause the laser beam to be turned off and on, the at least one processor, after a successfully decode during operation in the hands-free mode, controls activation of a laser beam system which generates the laser beam. In the laser barcode scanning/decoding system, the act of blinking the projected laser beam provides a visual indication to the user of a successful decode.

In an alternative embodiment for operating the barcode scanners in the trigger-operated mode, the at least one processor executes a set of programmable instructions for controlling the illumination system and/or the aiming system for changing the brightness of at least one LED or projected laser beam of the barcode imaging/decoding system to visually indicate a successful decode or other information, or in the laser barcode scanning/decoding system, the at least one processor executes a set of programmable instructions for controlling the laser beam system for changing the brightness of the projected laser beam to visually indicate a successful decode or other information to the user.

It is contemplated that different timing arrangements (i.e., blinking speeds) for causing the turning off and on of the at least one LED or all the LEDs of the illumination system and aiming system in barcode imaging/decoding systems, as well as the projected laser beam in laser barcode scanning/decoding systems and imaging/decoding systems, can provide visual indication to the user of additional information, such as the switching of barcode scanner from the trigger-operated mode to the hands-free mode and vice versa; a no-decode condition; loss of communication between a terminal and the barcode scanner; the mode the barcode scanner is currently operating in; the barcode is misaligned within the field of view of the barcode scanner; the symbology of the imaged or laser scanned barcode is not recognizable; a low battery condition in the case of a wireless barcode scanner powered by a battery; etc.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

As described in detail in this section, the present disclosure provides a barcode imaging/decoding system having improved visual decoding indication that overcomes the shortcomings of prior art barcode imaging/decoding systems and as prior art laser barcode scanning/decoding systems. In both type of systems, a barcode is read (either by imaging or laser scanning) and decoded as known in the art.

Figure 1:
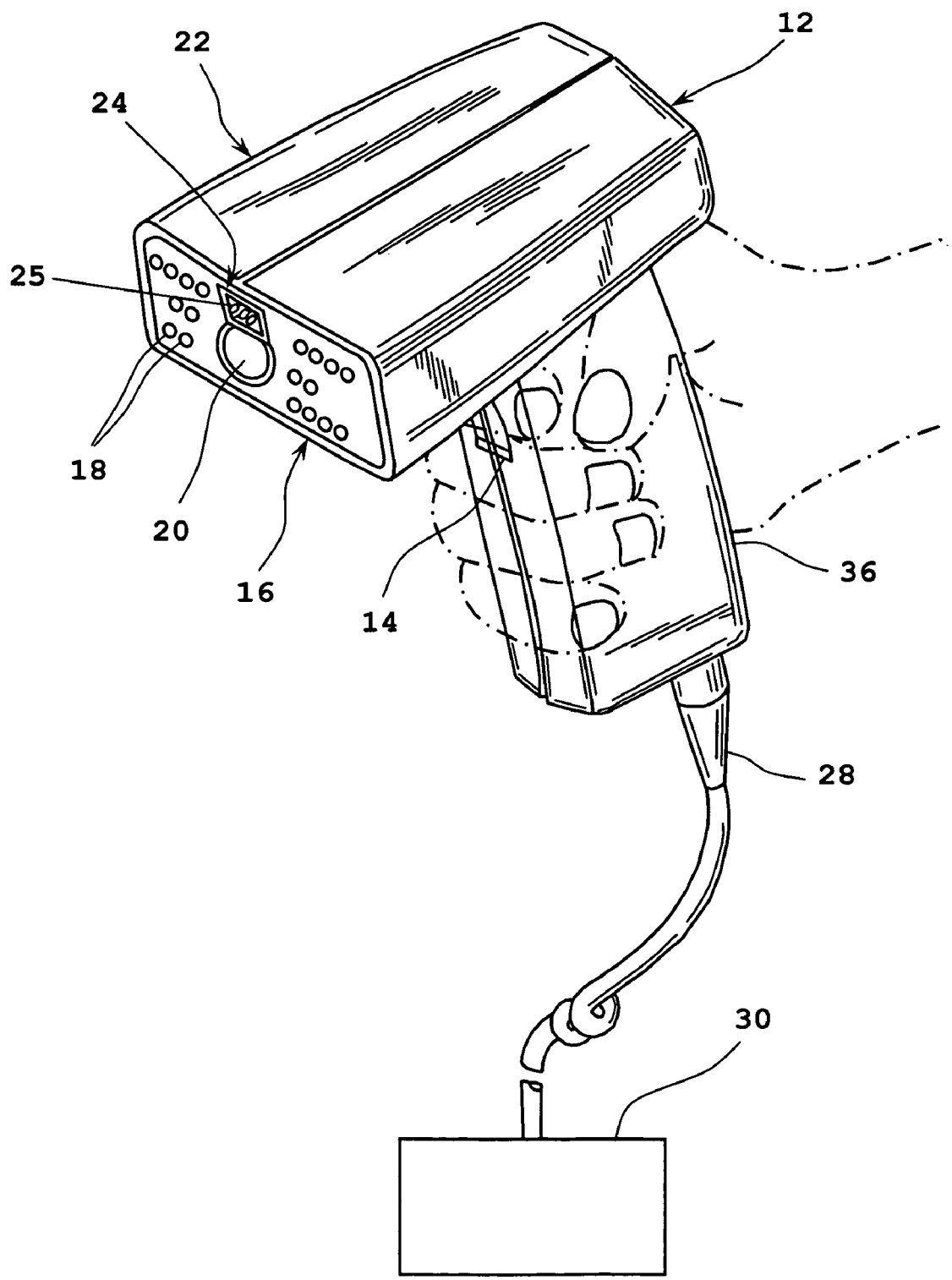
FIG. 1 is a schematic illustrating a barcode imaging/decoding system having improved visual decoding indication in accordance with the present disclosure being operated in a trigger-operated mode.

The system 10 as shown by FIG. 1 includes a barcode scanner 12 having a trigger switch 14 for being operated in a trigger-operated mode, an illumination system 16 having a plurality of LEDs 18, and an imaging engine 20 encased within a housing 22. The imaging engine as known in the art includes a lens assembly and a sensor array, such as a CCD or CMOS sensor array, for imaging a barcode located in a field of view of the imaging engine 20 upon activation of the trigger switch 14 and the illumination system 16. The sensor array can be a one-dimensional sensor array as used in linear barcode imaging systems. The system 10 further includes an aiming system 24 having a plurality of LEDs 25 (or a laser beam system) for projecting an aiming pattern onto the field of view for aiding in properly positioning the barcode in the field of view of the barcode scanner 12.

The system 10 further includes at least one processor 26 storing algorithms each corresponding to a respective symbology. The at least one processor 26 utilizes one of the algorithms for decoding the imaged barcode as known in the art. The at least one processor 26 further stores a set of programmable instructions for turning on the LEDs 18 of the illumination system 16 upon activation of the trigger switch 14 and for blinking at least one LED or all the LEDs 18 of the illumination and/or aiming system by turning them off and on one time or several times whenever the at least one processor 26 successfully decodes the imaged barcode as further discussed below with reference to the flowchart shown by FIG. 3. The at least one processor 26 can further turn on and off one time or several times the laser beam system projecting a laser beam of the aiming system whenever the at least one processor 26 successfully decodes the imaged barcode. The act of blinking at least one LED or all the LEDs 18 of the illumination and/or aiming system or the projected laser beam one time or several times provides a visual indication to a user of a successful decode.

A flexible electrical cable 28 is provided to connect the barcode scanner 12 to a host terminal 30. In alternative embodiments, the cable 28 may also provide electrical power to the imaging engine 20. In a further alternative embodiment, the cable 28 may be partially or fully replaced by wireless communication means such as radio frequency, optical or cellular communication means.

The host terminal 30 includes at least one data processor, where the at least one data processor may be connected to one or more peripherals or computing devices, such as a video monitor, and/or a network. Compressed image data may be transmitted to the host terminal 30 over electrical cable 28. The transmission of video data may be triggered by pressing the trigger switch 14 or by actuating another switch on the barcode scanner 12. The image data may be applied to a serial communication port of the host terminal 30 such as the serial communication port of a personal computer when such a device is used as the host terminal 30. The image data may be processed by a data processor within the personal computer and selectively displayed on monitor.

Figure 2:
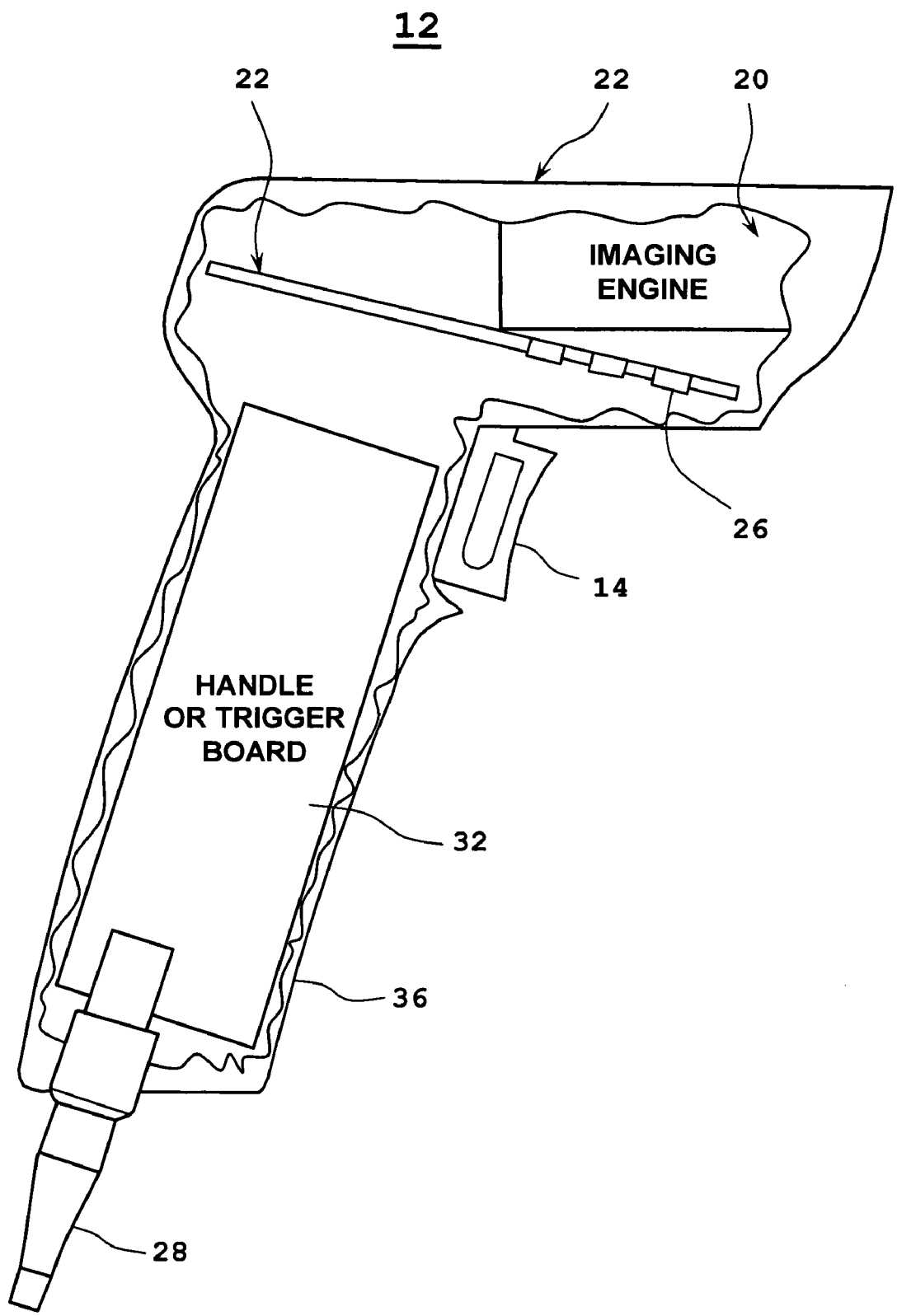
FIG. 2 is a schematic cross-sectional view of a barcode scanner of the barcode imaging/decoding system shown by FIG. 1.

FIG. 2 is a schematic cross-sectional view of the barcode scanner 12 in accordance with the present disclosure showing internal components of the barcode scanner 12, including the imaging engine 20, a trigger board 32, and a control and a logic circuit (CLC) board 34 having the at least one processor 26. The trigger board 32 located in a handle portion 36 of the handheld barcode scanner 12 is electrically associated or connected with the trigger switch 14 of the barcode scanner 12 in order to initiate a barcode image/decode procedure upon a user pressing the trigger switch 14. The CLC board 34, or portions thereof, may alternatively be provided externally from the barcode scanner 12, such as in the host terminal 30.

Figure 3:
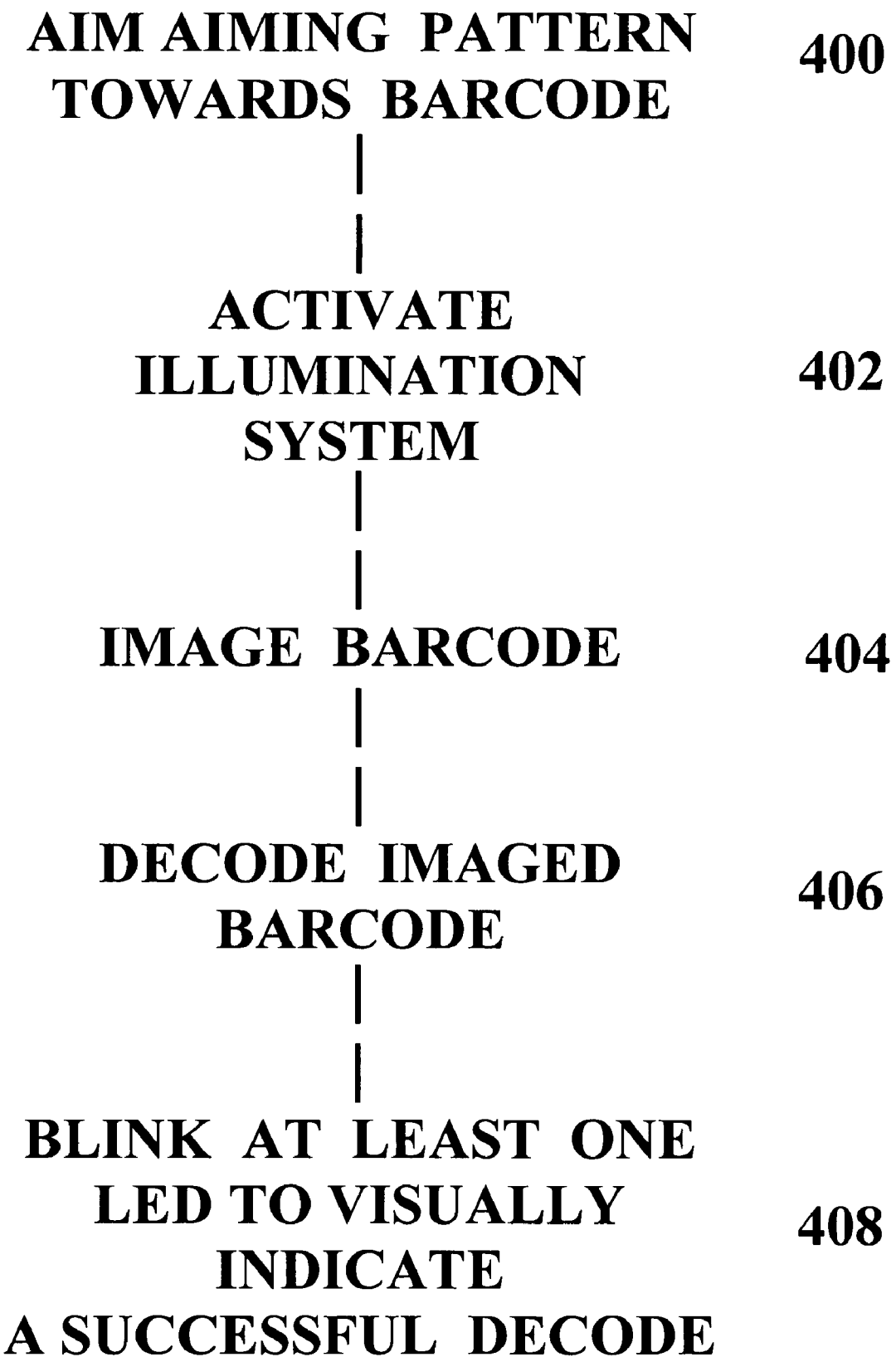
FIG. 3 is a flowchart showing trigger switch operation of a barcode imaging/decoding system having improved visual decoding indication in accordance with the present disclosure.

FIG. 3 is a flowchart showing an exemplary operation of a barcode imaging/decoding system having improved visual decoding indication in accordance with the present disclosure. In step 400, the user presses the trigger switch 14 to simultaneously activate the LEDs 18 of the illumination system 16 and the LEDs 25 of the aiming system 24. In step 402, the user aims the LEDs 25 of the aiming system 24 towards a barcode to project the aiming pattern onto the barcode. In step 404, the user further presses the trigger switch 14 such that the at least one processor 26 controls the imaging engine 20 for imaging the barcode, and in step 406, the at least one processor 26 decodes the imaged barcode. The at least one processor 26 then blinks at step 408 at least one LED of the LEDs of the illumination and/or aiming system by turning them off and on one time or several times to visually indicate a successful decode.

Figure 4:
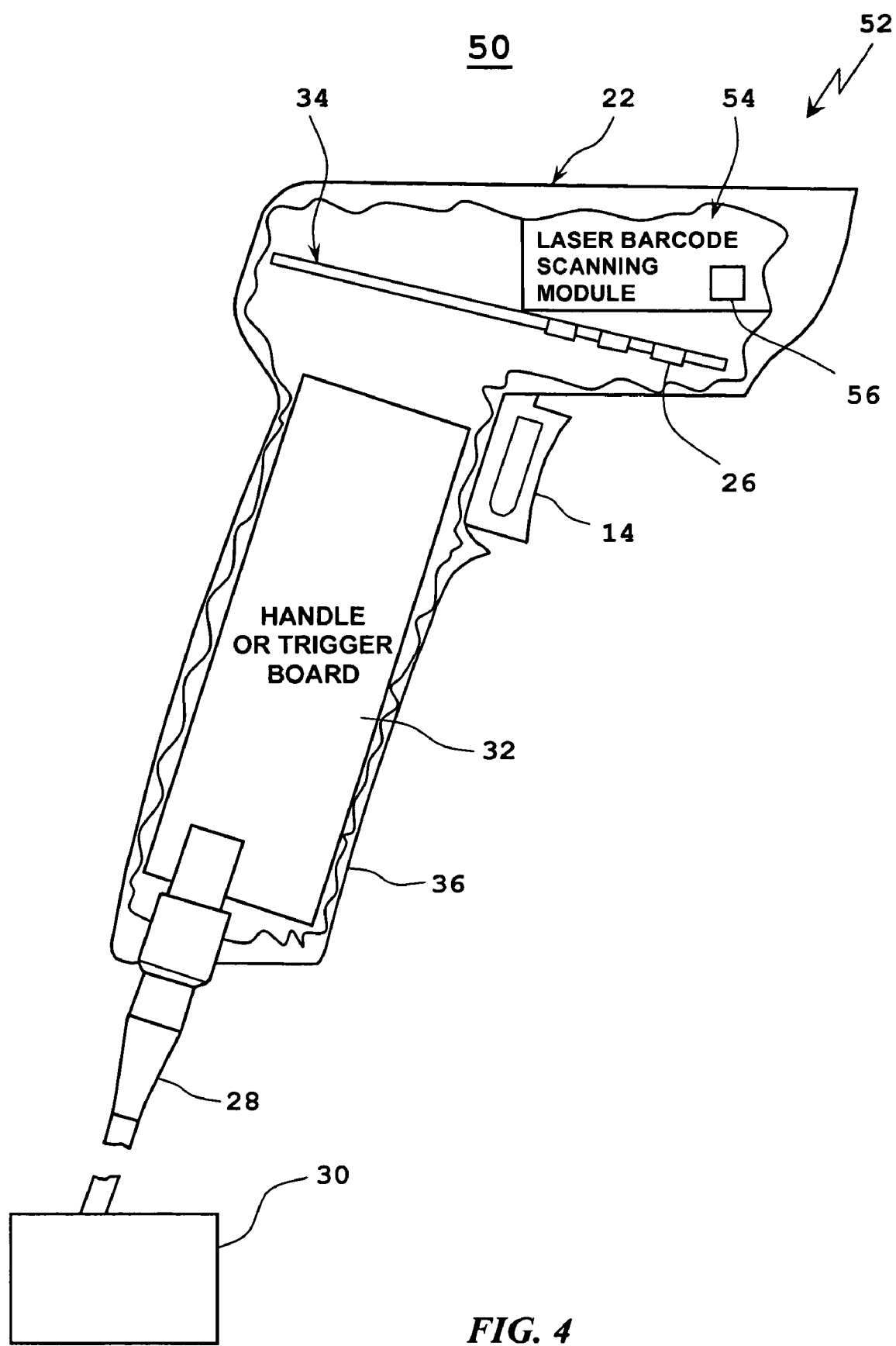
FIG. 4 is a schematic cross-sectional view of a barcode scanner of a laser barcode scanning/decoding system having improved visual decoding indication in accordance with the present disclosure being operated in a trigger-operated mode.

The act of blinking is also performed for a laser barcode scanning/decoding system 50 having a laser barcode scanner 52 as shown by FIG. 4 for providing a visual indication to the user of a successful decode. The barcode scanner 52 is similar to the barcode scanner 12 other than the replacement of the imaging engine 20 with a laser barcode scanning module 54 having a laser beam system 56 capable of generating and projecting a laser beam. Further, the barcode scanner 52 does not have an illumination and/or aiming system as the laser performs those functions.

Figure 5:
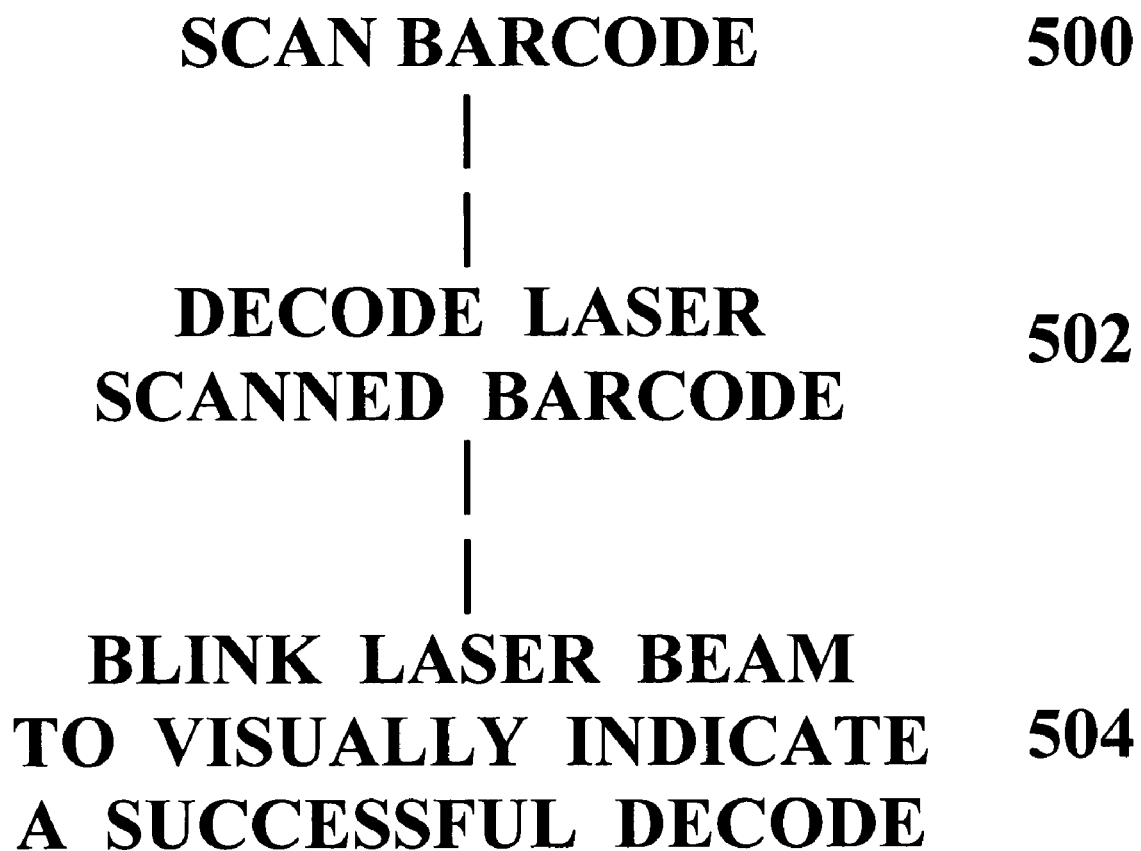
FIG. 5 is a flowchart showing trigger switch operation of a laser barcode scanning/decoding system having improved visual decoding indication in accordance with the present disclosure.

For the laser barcode scanning/decoding system 50, the at least one processor 26 of the CLC board 34 is programmed to execute a set of stored programmable instructions for causing the projected laser beam to blink by being turned off and on one time or several times whenever the at least one processor 26 successfully decodes a laser scanned barcode as shown by the flowchart of FIG. 5. To cause the laser beam to be turned off and on, the at least one processor 26, after a successfully decode, controls activation of a laser beam system 56 which generates the laser beam. In the laser barcode scanning/decoding system 50, the act of blinking the projected laser beam provides a visual indication to the user of a successful decode.

FIG. 5 is a flowchart showing an exemplary operation of a laser barcode scanning/decoding system having improved visual decoding indication in accordance with the present disclosure. In step 500, the laser barcode scanning module 54 is activated for generating the laser beam for aiming towards the barcode. In step 502, the at least one processor 26 controls the laser barcode scanning module 54 for scanning the barcode using the projected laser beam upon pressing by the user of the trigger switch 14, and in step 504, the at least one processor 26 decodes the laser scanned barcode. The at least one processor 26 then blinks at step 506 the projected laser beam by turning on and off the laser beam system 56 to visually indicate a successful decode.

Figure 6:
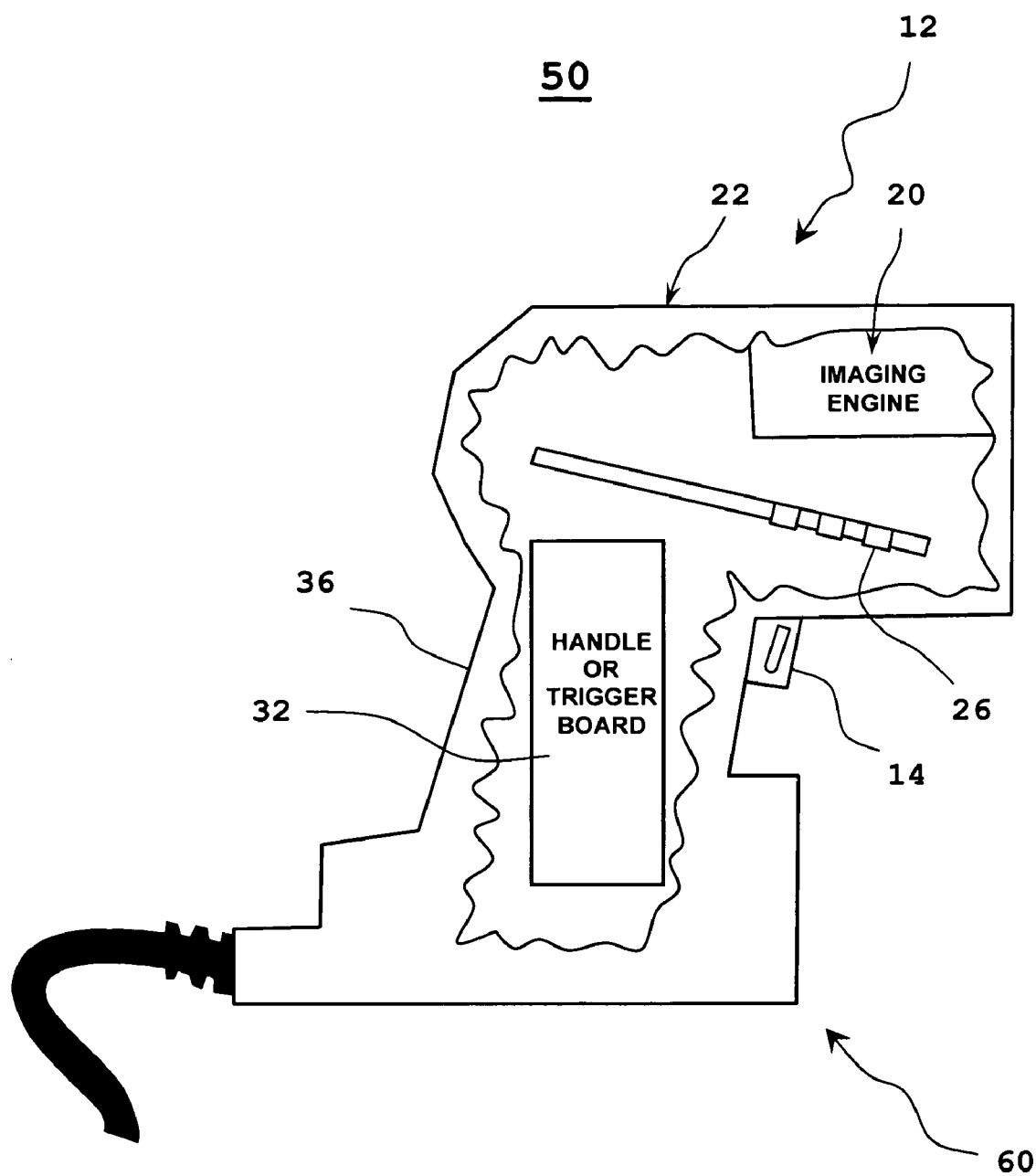
FIG. 6 is a schematic cross-sectional view of the barcode scanner of the barcode imaging/decoding system having improved visual decoding indication in accordance with the present disclosure being operated in a hands-free mode.

With reference to FIG. 6, there is shown the barcode scanner 12 being operated in a hands-free mode by placing it in a stand or cradle 60 as known in the art. The at least one processor 26 controls the LEDs 18 of the illumination system 16 such that the LEDs 18 of the illumination system 16 and/or the LEDs 25 (or laser beam in the case where the aiming system includes a laser beam system) of the aiming system 24 illuminate at a reduced brightness level. The LEDs while illuminating at the reduced brightness level project a visible line of light indicating where the barcode should be positioned. When the barcode scanner 12 detects that a barcode is positioned within its field of view as known in the art, the at least one processor 26 controls the illumination system 16 and/or aiming system 24 for illuminating the respective LEDs (and laser beam) at a full brightness level to assure aggressive decoding of the barcode.

When a successful decode occurs, the at least one processor 26 causes at least one LED or all the LEDs of the illuminating and/or aiming system (or laser beam) to blink by turning them off and on one time or several times to provide an unambiguous visual indication of a successful decode. The at least one processor 26 then causes the LEDs of the illumination and/or aiming system (and laser beam of the aiming system) to illuminate at the reduced brightness level in preparation for the next barcode. When the barcode scanner 12 is removed from the stand or cradle 60, the barcode scanner 12 automatically returns to the trigger-operated mode and all LEDs of the illumination and/or aiming system are turned off, until the trigger switch 14 is pressed.

The act of blinking the projected laser beam can also be performed for the laser barcode scanning/decoding system 50 having the barcode scanner 52 being operated in the hands-free mode for providing a visual indication to the user of a successful decode. The at least one processor 26 executes a set of programmable instructions for controlling the laser beam system 56 for generating the laser beam at a reduced brightness level when operating in the hands-free mode. The laser beam indicates to a user where the barcode should be positioned. When the barcode scanner 52 detects that a barcode is positioned within its field of view as known in the art, the at least one processor 26 executes a set of programmable instructions for controlling the laser beam system 56 for generating the laser beam at a full brightness level to assure aggressive decoding of the barcode.

Further, the at least one processor 26 further executes a set of stored programmable instructions for causing the projected laser beam to blink by turned off and on (or to be switched between two or more distinct brightness levels) one time or several times whenever the at least one processor 26 successfully decodes a laser scanned barcode. To cause the laser beam to be turned off and on, the at least one processor 26, after a successfully decode during operation in the hands-free mode, controls activation of the laser beam system 56 which generates the laser beam. In the laser barcode scanning/decoding system 50, the act of blinking the projected laser beam provides a visual indication to the user of a successful decode.

The at least one processor 26 for the barcode imaging/decoding and laser barcode scanning/decoding systems described above blinks the at least one LED or all the LEDs 18, 25 of the illumination and/or aiming system, and the laser beam generated by the laser beam system 56 immediately following a successful decode by turning off the LEDs/laser beam system followed around 50 msec (50 ms is an example, not the only acceptable time) later by turning on the LEDs/laser beam system for around 50 msec, followed by turning off the LEDs/laser beam system again and on again for 50 msec each, until finally turning off the LEDs 18 of the illumination system 16 and turning off the LEDs 25 of the aiming system 24 (or operating at least one of the LEDs 18, 25 at a reduced brightness level), and turning off the laser beam system 56 (or controlling the laser beam system 56 to project the laser beam at a reduced brightness level), until a next reading operation is initiated by the user pressing the trigger switch 14 (or presenting a barcode to the barcode scanner while operating the barcode scanner in the hands-free mode).

The blinking of the illumination system 16 and the laser beam system 56 appears distinctly different than the case where the illumination system 16 and the laser beam system 56 are simply turned off, as it typically occurs after a time-out or if the trigger switch 14 is released. The blinking of at least one LED and/or the laser beam system 56 leaves no doubt in the user's mind that the barcode has been successfully decoded, even if a beeper which causes a beeping sound upon a successful decode has been turned off or is inaudible due to high ambient noise levels.

The time duration of the blinking is within the response time of the human eye. The human eye can discern individual blinks up to a speed of around 30 blinks per second. Above this speed, the illumination appears to be continuous. The blink frequency that is used in the systems disclosed herein is therefore less than 30 blinks per second. Preferably, the blink frequency is 5-10 Hz In an alternative embodiment for operating the barcode scanners 12, 52 in the trigger-operated mode, the at least one processor 26 executes a set of programmable instructions for controlling the illumination system 16 and/or the aiming system 24 for changing the brightness of at least one LED or projected laser beam of the barcode imaging/decoding system 10 to visually indicate a successful decode or other information, or in the laser barcode scanning/decoding system, the at least one processor 26 executes a set of programmable instructions for controlling the laser beam system 56 for changing the brightness of the projected laser beam to visually indicate a successful decode or other information to the user.

It is contemplated that different timing arrangements (i.e., blinking speeds) for causing the turning off and on of the at least one LED or all the LEDs 18, 25 of the illumination system 16 and aiming system 24, as well as the projected laser beam in the laser barcode scanning/decoding system 50 and imaging/decoding systems, can provide visual indication to the user of additional information, such as the switching of barcode scanner from the trigger-operated mode to the hands-free mode and vice versa; a no-decode condition; loss of communication between the terminal 30 and the barcode scanner; the mode the barcode scanner is currently operating in; the barcode is misaligned within the field of view of the barcode scanner; the symbology of the imaged or laser scanned barcode is not recognizable; a low battery condition in the case of a wireless barcode scanner powered by a battery; etc. For example, it is contemplated that the at least one processor 26 controls blinking of the at least one LED or all the LEDs (or projected laser beam) according to at least two different timing arrangements or blinking speeds each corresponding to a unique visual indication.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A barcode scanning system comprising:
   a barcode scanner having means for reading and decoding a barcode positioned within a field of view of the barcode scanner;
   a radiation emitting system for emitting radiation for illuminating the field of view of the barcode scanner; and
   at least one processor for controlling the radiation emitting system for a period of time for providing at least one visual indication indicative of the operation of the barcode scanning system, wherein the at least one visual indication illuminates at least a portion of the field of view, and wherein the operation of the barcode scanning system is determinable following the lapse of at least a portion of the period of time.

2. The system according to claim 1, wherein radiation emitting system comprises at least one LED for illuminating the field of view.

3. The system according to claim 1, wherein the radiation emitting system is at least one of an illumination system and an aiming system for projecting an aiming pattern onto the field of view.

4. The system according to claim 1, wherein the radiation emitting system is a laser beam system for generating a laser beam, wherein the at least one processor controls blinking of the laser beam for providing the at least one visual indication.

5. The system according to claim 1, wherein the at least one visual indication is a successful decode of the barcode.

6. The system according to claim 1, wherein the at least one visual indication is selected from the group consisting of switching of barcode scanner from a trigger-operated mode to a hands-free mode and vice versa; a no-decode condition; loss of communication between a terminal and the barcode scanner; a mode the barcode scanner is operating in; the barcode is misaligned within the field of view of the barcode scanner; the symbology of the barcode is not recognizable; and a low battery condition.

7. The system according to claim 1, wherein the at least one processor controls the radiation emitting system for illuminating at a reduced brightness level when a barcode is not positioned within the field of view of the barcode scanner, and for said radiation emitting system to illuminate at a full brightness level when a barcode is positioned within the field of view of the barcode scanner.

8. The system according to claim 7, wherein the at least one processor controls the radiation emitting system for illuminating at the reduced brightness level and at the frill brightness level when operating the barcode scanner in a hands-free mode.

9. The system according to claim 1, wherein the at least one processor controls the radiation emitting system according to at least two different timing arrangements each corresponding to a unique visual indication.

10. A method for operating a barcode scanning system comprising the steps of:
    reading and decoding a barcode positioned within a field of view of the barcode scanner by operating a barcode scanner of the barcode scanning system in at least one reading and decoding mode;
    illuminating at least a portion of the field of view of the barcode scanner using a radiation emitting system; and
    providing at least one visual indication with respect to the operation of the barcode scanning system by controlling the operation of the radiation emitting system for a period of time, wherein the at least one visual indication illuminates at least a portion of the field of view, and wherein the operation of the barcode scanning system is determinable following the lapse of at least a portion of the period of time.

11. The method according to claim 10, wherein the radiation emitting system comprises at least one LED for illuminating at least a portion of the field of view.

12. The method according to claim 10, wherein the radiation emitting system is at least one of an limitation system and an aiming system for projecting an aiming pattern onto the field of view.

13. The method according to claim 10, wherein the radiation emitting system is a laser beam system for generating a laser beam, wherein the at least one processor controls blinking of the laser beam for providing the at least one visual indication.

14. The method according to claim 10, wherein the at least one visual indication is a successful decode of the barcode.

15. The method according to claim 10, wherein the at least one visual indication is selected from the group consisting of switching of barcode scanner from a trigger-operated mode to a hands-free mode and vice versa; a no-decode condition; loss of communication between a terminal and the barcode scanner; a mode the barcode scanner is operating in; the barcode is misaligned within the field of view of the barcode scanner; the symbology of the barcode is not recognizable; and a low battery condition.

16. The method according to claim 10, further comprising the steps of:
controlling the radiation emitting system for illuminating at a reduced brightness level when a barcode is not positioned within the field of view of the barcode scanner, and
controlling the radiation emitting system for illuminating at a frill brightness level when a barcode is positioned within the field of view of the barcode scanner.

17. The method according to claim 16, wherein the steps of controlling the radiation emitting system for illuminating at the reduced brightness level and at the full brightness level are performed when operating the barcode scanner in a hands-free mode.

18. The method according to claim 10, further comprising the step of controlling the radiation emitting system according to at least two different timing arrangements each corresponding to a unique visual indication.

19. A barcode scanning system comprising:
a barcode scanner having means for reading and decoding a barcode positioned within a field of view of the barcode scanner;
a radiation emitting system for illuminating at least a portion of the field of view of the barcode scanner; and
at least one processor for controlling the radiation emitting system for a period of time for providing at least one visual indication with respect to the operation of the barcode scanning system, wherein the at least one visual indication illuminates at least a portion of the field of view, and wherein the operation of the barcode scanning system is determinable following the lapse of at least a portion of the period of time.

20. The system according to claim 19, wherein radiation emitting system comprises at least one LED for illuminating the field of view.

21. The system according to claim 19, wherein the radiation emitting system is at least one of an illumination system and an aiming system for projecting an aiming pattern onto the field of view.

22. The system according to claim 19, wherein the radiation emitting system is a laser beam system for generating a laser beam, wherein the at least one processor controls blinking of the laser beam for providing the at least one visual indication.

23. The system according to claim 19, wherein the at least one visual indication is a successful decode of the barcode.

24. The system according to claim 19, wherein the at least one visual indication is selected from the group consisting of switching of barcode scanner from a trigger-operated mode to a hands-free mode and vice versa; a no-decode condition; loss of communication between a terminal and the barcode scanner; a mode the barcode scanner is operating in; the barcode is misaligned within the field of view of the barcode scanner; the symbology of the barcode is not recognizable; and a low battery condition.

25. The system according to claim 19, wherein the at least one processor controls the radiation emitting system for illuminating at a reduced brightness level when a barcode is not positioned within the field of view of the barcode scanner, and for said radiation emitting system to illuminate at a fill brightness level when a barcode is positioned within the field of view of the barcode scanner.

26. The system according to claim 25, wherein the at feast one processor controls the radiation emitting system for illuminating at the reduced brightness level and at the full brightness level when operating the barcode scanner in a hands-free mode.

27. The system according to claim 19, wherein the at least one processor controls the radiation emitting system according to at least two different timing arrangements each corresponding to a unique visual indication.

* * * * *